(12) United States Patent
Bryant et al.

(10) Patent No.: US 6,535,946 B1
(45) Date of Patent: Mar. 18, 2003

(54) LOW-LATENCY CIRCUIT FOR SYNCHRONIZING DATA TRANSFERS BETWEEN CLOCK DOMAINS DERIVED FROM A COMMON CLOCK

(75) Inventors: Christopher D. Bryant, Austin, TX (US); Robin W. Edenfield, Dallas, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,321

(22) Filed: Jan. 4, 2000

(51) Int. Cl.[7] .............................. G06F 13/00; H04L 7/00
(52) U.S. Cl. ...................... 710/305; 375/354; 713/400; 327/141
(58) Field of Search ..................... 710/305; 713/400; 375/354; 327/141, 144, 145, 146; 325/147

(56) References Cited

U.S. PATENT DOCUMENTS

| | | | | |
|---|---|---|---|---|
| 5,022,057 A | * | 6/1991 | Nishi et al. ................. 375/373 |
| 5,132,990 A | * | 7/1992 | Dukes ......................... 375/362 |
| 5,487,092 A | * | 1/1996 | Finney et al. ............... 375/354 |
| 5,680,594 A | * | 10/1997 | Charneski et al. .......... 713/400 |
| 6,175,603 B1 | * | 1/2001 | Chapman et al. ........... 375/354 |
| 6,239,626 B1 | * | 5/2001 | Chesavage ................... 327/147 |

* cited by examiner

Primary Examiner—Xuan Thai
(74) Attorney, Agent, or Firm—Davis Munck, P.C.

(57) ABSTRACT

There is disclosed, for use in an x86-compatible processor, an interface circuit for synchronizing the transfer of signals between different clock domains derived from a common core clock, where the phase and frequency relationships between the different domain clocks are known. The interface circuit comprises 1) a first latch having a data input for receiving a data signal from the first clock domain, a clock input for receiving the first clock signal, and an output; 2) a second latch having a data input coupled to the first latch output, an enable input for receiving a gating signal, a clock input for receiving the first clock signal, and an output; 3) a third latch having a data input for receiving the data signal, an enable input for receiving a gating signal, a clock input for receiving the first clock signal, and an output; and 4) a multiplexer having a first data input coupled to the second latch output, a second data input coupled to the third latch output, and a selector input for selecting one of the first data input and the second data input for transfer to an output of the multiplexer.

20 Claims, 6 Drawing Sheets

LOW-LATENCY CIRCUIT FOR SYNCHRONIZING DATA TRANSFERS BETWEEN CLOCK DOMAINS DERIVED FROM A COMMON CLOCK

CROSS-REFERENCE TO RELATED APPLICATION

The present invention is related to that disclosed in U.S. patent application Ser. No. 09/477,488, filed concurrently herewith, entitled ALOW LATENCY CLOCK DOMAIN SYNCHRONIZATION CIRCUIT AND METHOD OF OPERATION. The above application is commonly assigned to the assignee of the present invention. The disclosure of the related patent application is hereby incorporated by reference for all purposes as if fully set forth herein.

TECHNICAL FIELD OF THE INVENTION

The present invention is directed, in general, to microprocessors and, more specifically, to synchronization circuits for transferring data between two different clock domains controlled by a processing device.

BACKGROUND OF THE INVENTION

The ever-growing requirement for high performance computers demands that state-of-the-art microprocessors execute instructions in the minimum amount of time. Over the years, efforts to increase microprocessor speeds have followed different approaches, including increasing the speed of the clock that drives the processor and reducing the number of clock cycles required to perform a given instruction.

Microprocessor speeds may also be increased by reducing the number of gate delays incurred while executing an operation. Under this approach, the microprocessor is designed so that each data bit or control signal propagates through the smallest possible number of gates when performing an operation. Additionally, the propagation delay through each individual gate is also minimized in order to further reduce the end-to-end propagation delay associated with transmitting a control signal or a data bit during the execution of an instruction.

One area where it is important to minimize propagation delays occurs at the interface between clock domains. Conventional microprocessors contain many clock signals that are derived from a basic high-frequency core clock. The core clock signal may be divided down to produce clock signals that are related, for example, by an N:1 ratio or by an (N+2):1 ratio. For instance, dividing the core clock by two and dividing the core clock by four yields two clock signals that are in a 2:1 ratio. Similarly, dividing the core clock by two and dividing the core clock by five yields two clock signals that are in a 2.5:1 ratio. These different clock domain signals may drive internal microprocessor components or may be brought off-chip to drive external devices, such as main memory, input/output (I/O) buses, and the like.

At the interface between two clock domains, there is no guarantee that a signal transmitted from a first clock domain will be synchronized with the clock in a second clock domain. Normally, synchronization between different clock domains is handled by a set of synchronizing flip-flops. A signal in a first clock domain is first registered in a flip-flop in the first clock domain. The output of that first flip-flop is then Adouble sampled@ by two flip-flop in the second clock domain. Double sampling means that the output of the first flip-flop feeds the input of a second flip-flop clocked in the second clock domain. The output of the second flip-flop feeds the input of a third flip-flop that also is clocked in the second clock domain. The output of this third flip-flop is properly synchronized with the second clock domain. An identical three flip-flop interface circuit is used to synchronize signals that are being transmitted in the reverse direction (i.e., from the second clock domain to the first clock domain). This synchronizing circuit, along with grey code encoding of multi-bit signals provides a means for synchronizing two asynchronous clock domains.

The chief drawback of the above-described flip-flop interface circuit is the fact that there are three gate propagation delays involved in transmitting a signal from one clock domain to another clock domain. This necessarily slows down the operation of the microprocessor and/or an external device communicating wit the microprocessor, since the circuits in the receiving domain receive the transmitted signal only after at least three propagation delays.

Therefore, there is a need in the art for improved microprocessor designs that maximize the throughput of a processor and any external devices communicating with the processor. In particular, there is a need in the art for improved circuits that interface signals between different clock domains. More particularly, there is a need for interface circuits that minimize the number of gate delays that affect a signal being transmitted from a faster clock domain to a slower clock domain, and vice versa.

SUMMARY OF THE INVENTION

The limitations inherent in the prior art described above are overcome by the present invention, which provides an interface circuit for synchronizing the transfer of data through an output port from a first clock domain driven by a first clock signal to a second clock domain driven by a second clock signal. In an advantageous embodiment, the interface circuit comprises 1) a first latch having a data input for receiving a data signal from the first clock domain, and enable input for receiving an enabling signal, a clock input for receiving the first clock signal, and an output; 2) a second latch having a data input coupled to the first latch output, a clock input for receiving a gating signal, a clock input for receiving the first clock signal, and an output; 3) a third latch having a data input for receiving the data signal, and enable input for receiving a phase sel3ect signal, a clock input for receiving the first clock signal, and an output; and 4) a multiplexer having a first data input coupled to the second latch output, a second data input coupled to the third latch output, and a selector input for selecting one of the first data input and the second data input for transfer to an output of the multiplexer.

According to one embodiment of the present invention, the second clock signal and the first clock signal are derived from a common core clock.

According to another embodiment of the present invention, a frequency of the second clock signal and a frequency of the first clock signal are in a ratio of N:1 where N is an integer.

According to still another embodiment of the present invention, a selection signal applied to the selector input selects the first data input of the multiplexer when a rising edge of the first clock signal is approximately in phase with a rising edge of the second clock signal.

According to yet another embodiment of the present invention, a frequency of the second clock signal and a frequency of the first clock signal are in a ratio of (N+2):1 where N is an integer.

According to a further embodiment of the present invention, a selection signal applied to the selector input selects the first data input of the multiplexer during one clock cycle of the second clock signal.

The present invention may also be embodied as an interface circuit for synchronizing the transfer of data from an output of a state machine in a first clock domain driven by a first clock signal to a second clock domain driven by a second clock signal. In an advantageous embodiment, the state machine interface circuit comprises 1) a first latch having a data input for receiving the state machine output, a clock input for receiving the first clock signal, and an output; and 2) a second latch having a data input coupled to the first latch output, a clock input for receiving a gating signal, and an output coupled to an input of the state machine.

According to one state machine interface embodiment of the present invention, the second clock signal and the first clock signal are derived from a common core clock.

According to another state machine interface embodiment of the present invention, a frequency of the second clock signal and a frequency of the first clock signal are in a ratio of N:1 where N is an integer.

According to still another state machine interface embodiment of the present invention, a frequency of the second clock signal and a frequency of the first clock signal are in a ratio of (N+2):1 where N is an integer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms Ainclude@ and Acomprise,@ as well as derivatives thereof, mean inclusion without limitation; the term Aor,@ is inclusive, meaning and/or; the phrases Aassociated with@ and Aassociated therewith,@ as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term Acontroller@ means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated microprocessor.

Integrated Processor System

Figure 1:
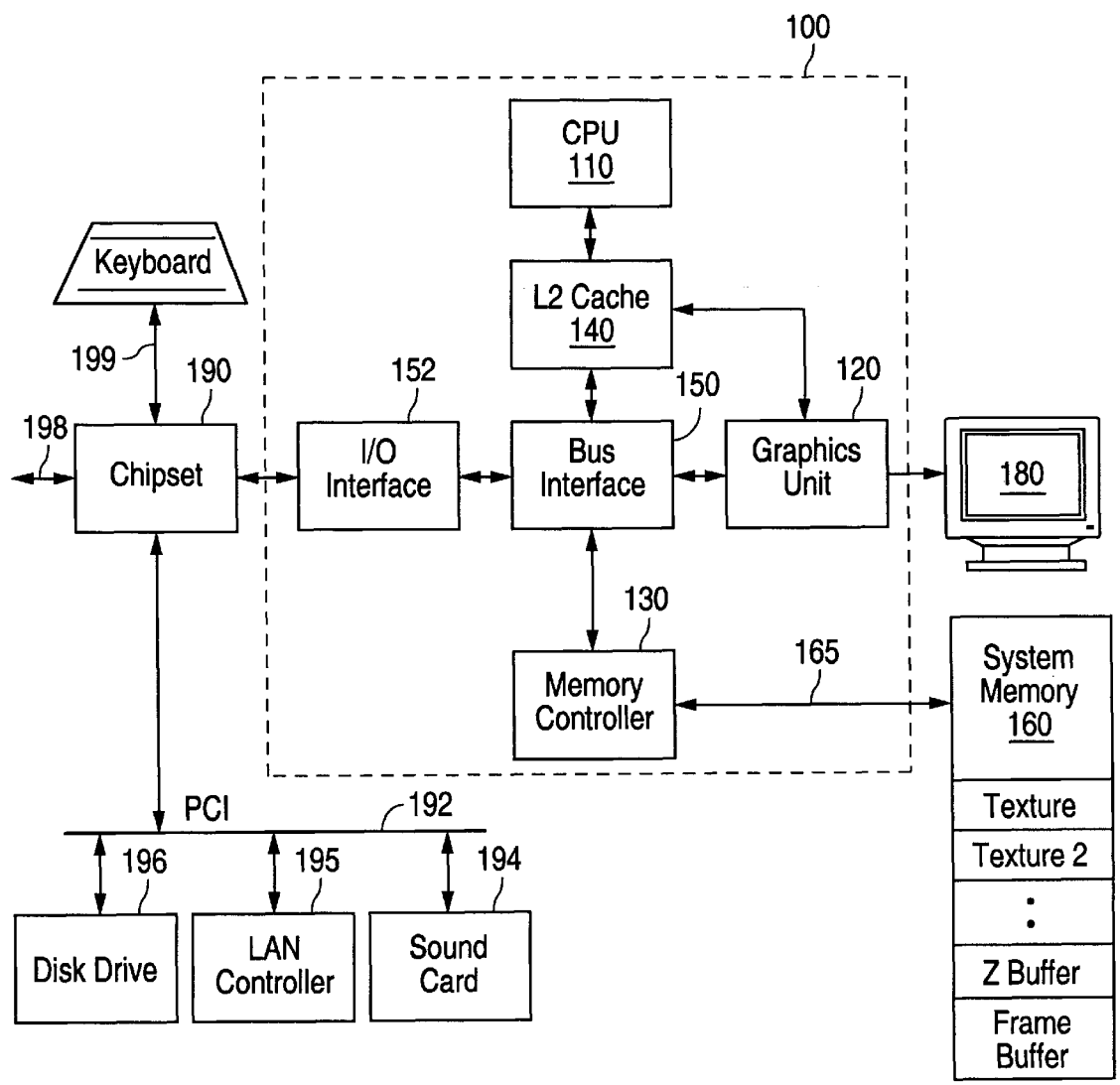
FIG. 1 is a block diagram of an exemplary integrated processor system, including an integrated microprocessor in accordance with the principles of the present invention.

FIG. 1 is a block diagram of an exemplary integrated processor system, including integrated processor 100 in accordance with the principles of the present invention. Integrated microprocessor 100 includes central processing unit (CPU) 110, which has dual integer and dual floating point execution units, separate load/store and branch units, and L1 instruction and data caches. Integrated onto the microprocessor die is graphics unit 120, system memory controller 130, and L2 cache 140, which is shared by CPU 110 and graphics unit 120. Bus interface unit 150 interfaces CPU 110, graphics unit 120, and L2 cache 140 to memory controller 130.

Integrated memory controller 130 bridges processor 100 to system memory 160, and may provide data compression and/or decompression to reduce bus traffic over external memory bus 165 which preferably, although not exclusively, has a RAMbusJ, fast SDRAM or other type protocol. Integrated graphics unit 120 provides TFT, DSTN, RGB, and other types of video output to drive display 180.

Bus interface unit 150 interfaces, through I/O interface 152, processor 100 to chipset bridge 190 for conventional peripheral bus 192 connection (e.g., PCI connection) to peripherals, such as sound card 194, LAN controller 195, and disk drive 196, as well as fast serial link 198 (e.g., IEEE 1394 "firewire" bus and/or universal serial bus "USB") and relatively slow I/O port 199 for peripherals, such as a keyboard and/or a mouse. Alternatively, chipset bridge 160 may integrate local bus functions such as sound, disk drive control, modem, network adapter, etc.

Integrated CPU

Figure 2:
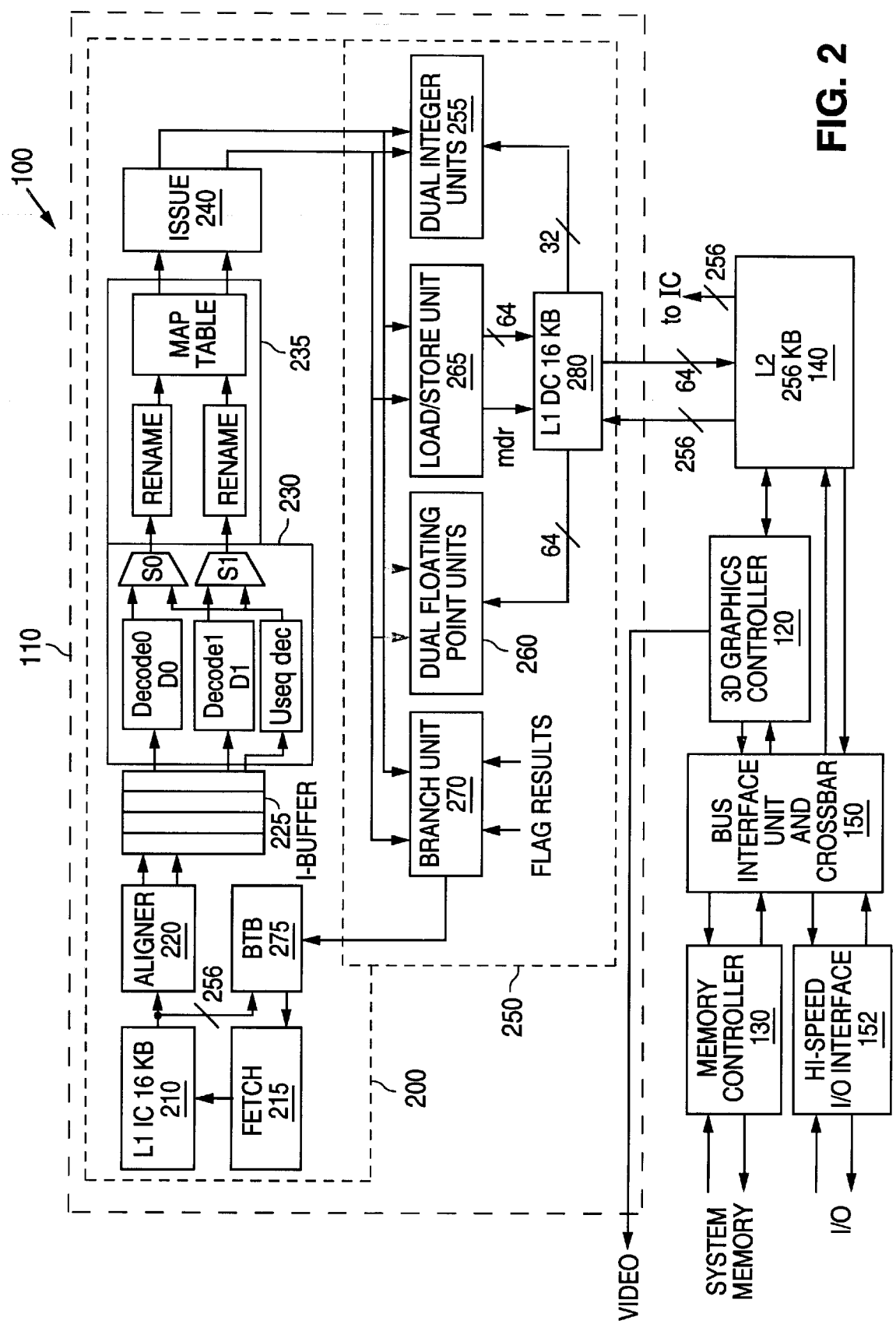
FIG. 2 illustrates in more detail the exemplary integrated microprocessor in FIG. 1 in accordance with one embodiment of the present invention.

FIG. 2 illustrates in more detail the exemplary integrated processor 100, including CPU 110, which is integrated with graphics controller 120, memory controller 130, and L2 unified cache 140 (e.g., 256 KB in size). CPU 110 includes an execution pipeline with instruction decode/dispatch logic 200 and functional units 250.

Instruction decode/dispatch logic 200 decodes variable length x86 instructions into nodes (operations) each containing source, destination, and control logic. Each instruction maps into one or more nodes, which are formed into checkpoints for issue in parallel to functional units 250. The exemplary execution pipeline includes dual integer units (EX) 255, dual pipelined floating point units (FP) 260, load/store unit (LDST) 265, and branch unit (BR) 270. Hence, a single checkpoint can include up to 2 EX, 2 FP, 1 LDST, and 1 BR nodes which can be issued in parallel. L1 data cache (DC) 280 (e.g., 16 KB in size) receives data requests from the LDST unit and, in the case of an L1 hit, supplies the requested data to appropriate EX or FP unit.

BR unit 270 executes branch operations based on flag results from the EX units. Predicted (taken/not-taken) and not-predicted (undetected) branches are resolved (mispredictions incur, for example, a 12 clock penalty) and branch information is supplied to BTB 275, including branch address, target address, and resolution (taken or not taken). BTB 275 includes a 1 KB target cache, a 7-bit history and prediction ROM, and a 16-entry return stack.

Instruction decode/dispatch logic 200 includes L1 instruction cache (IC) 210 (e.g., 16 KB in size) which stores 32-byte cache lines (8 dwords/4 qwords). Each fetch operation, fetch unit 215 fetches a cache line of 32 instruction bytes from the L1 instruction cache to aligner logic 220. Fetch unit 215 either (a) generates a fetch address by incrementing the previous fetch address (sequential fetch) or, (b) if the previous fetch address hit in BTB 275, switches the code stream by supplying the fetch address for the cache line containing the target address provided by BTB 275. Fetch unit 215 supplies a linear address simultaneously to L1 instruction cache 210 and BTB 275. A two-level translation look-aside buffer (TLB) structure (a 32-entry L1 instruction TLB and a 256-entry shared L2 TLB) supplies a corresponding physical address to the L1 cache to complete cache access.

Aligner logic 220 identifies up to two x86 variable length instructions per clock. Instructions are buffered in instruction buffer 225, along with decode and issue constraints. Decoder 230 transfers instructions from the instruction buffer to the appropriate one (as determined by decode constraints stored with the instruction) of decoders D0, D1, and Useq (a microsequencer). D0 and D1 define two decode slots (or paths) S0 and S1, with the Useq decoder feeding nodes into both slots simultaneously.

D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to D0. The Useq decoder handles instructions that decode into more than two nodes/operations (e.g., far calls/returns, irets, segment register loads, floating point divides, floating point transcendentals). Each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint. Up to 16 checkpoints may be active (i.e., issued to functional units). Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX and 3DNow instructions, as well as standard x87 floating point, instruction execution. FPU0 includes a pipelined FAdder and FPU1 includes a pipelined Fmultipler, both supporting packed SIMD operations.

Integer multiply operations are issued to FPU1 with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

LDST unit 265 executes memory reference operations as loads/stores to/from data cache 280 (or L2 cache 140). LDST unit 265 performs pipelined linear address calculation and physical (paged) address translation, followed by data cache access with the physical (translated) address. Address translations are performed in order using a two-level TLB structure (a 32 entry L1 data TLB and the 256 entry shared L2 TLB). Up to four pending L1 misses can be outstanding. Missed data returns out of order (from either L2 cache 140 or system memory 160).

Exemplary 16 KB L1 instruction cache 210 is single-ported 4-way associative, with 2 pending misses. Exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, L2 cache 140 transfers an entire cache line (32 bytes/256 bits) in one cycle with a 7 clock access latency for L1 misses that hit in L2 cache 140.

Exemplary 256 KB L2 cache 140 is 8-way associative and 8-way interleaved. Each interleave supports one L1 (code/data) miss per cycle, and either one L1 store or one L2 fill per cycle. Portions or all of 2 of the 8 ways may be locked down for use by graphics controller 120.

For integer register-to-register operations, the execution pipeline is eleven (11) stages from code fetch to completion: two cache access stages (IC1 and IC2), two alignment stages (AL1 and AL2), three decode/rename stages (DEC0–DEC2), checkpoint issue stage (ISS), and reservation stage (RS), followed by the execute and result writeback/forward stages (EX and WB). For integer register-memory operations, the LDST unit pipeline adds an additional four stages between RS and EX: address calculation (AC), translation (XL), and data cache access and drive back DC and DB. The floating point adder pipeline comprises four stages and the floating point multiply pipeline comprises five stages.

Different functional blocks in integrated processor 100 may operate at different clock speeds. Each group of circuits that are driven at a specified clock speed is referred to as a clock domain. As described above in the Background, special synchronization circuitry is needed to transfer data from one clock domain to another clock domain. However, because all of the clock domains in integrated processor 100 are derived from a common core clock, the phase and frequency relationships between the different clock domains are known. The present invention use knowledge of the phase and frequency relationships between clock domains to provide unique synchronization circuits that minimize the number of gates and clock delays encountered when transferring data from one domain to another domain.

Figure 3:
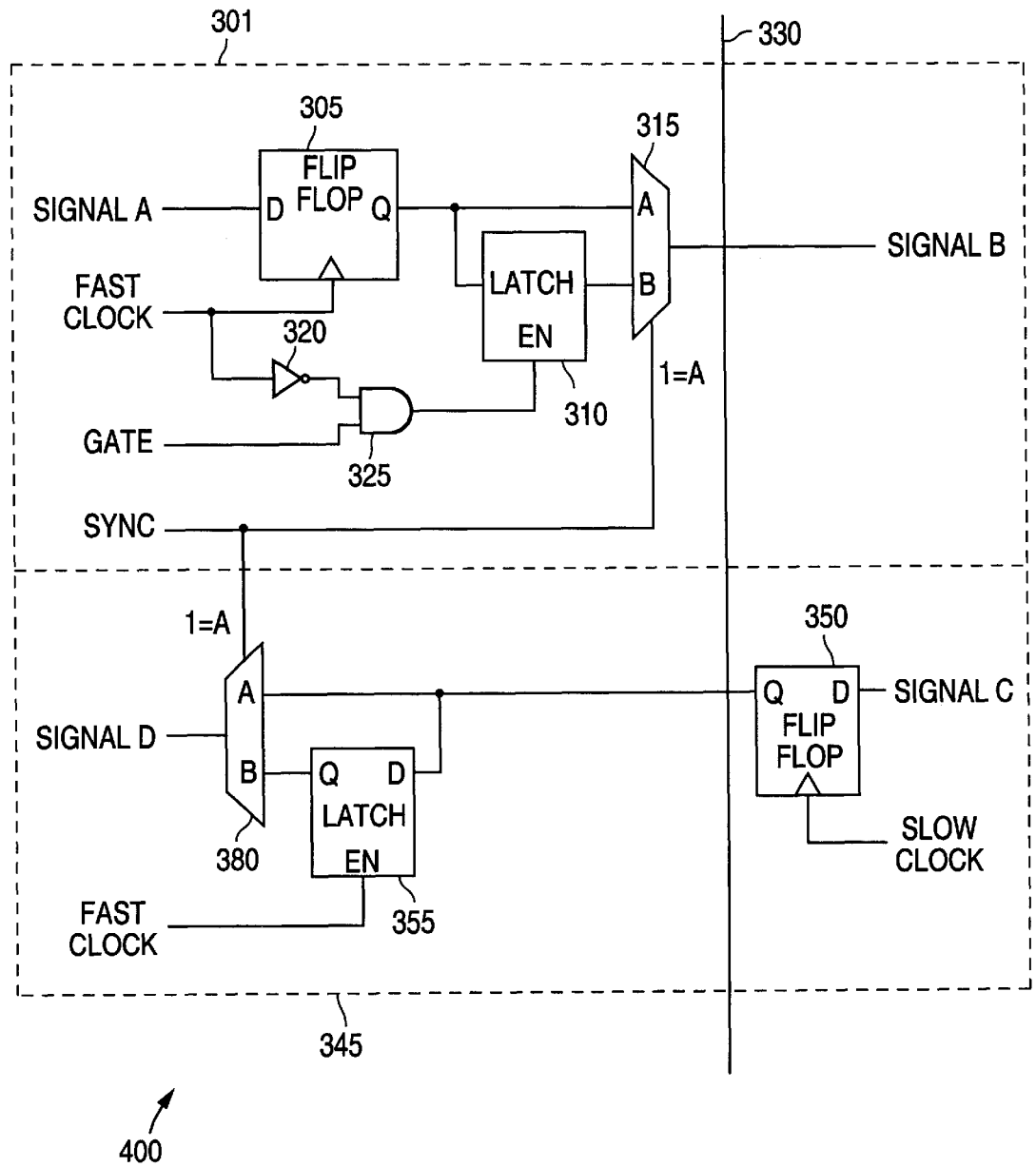
FIG. 3 is a schematic diagram of a synchronization circuit for synchronizing the output of a state machine to a clock domain.

FIG. 3 is a schematic diagram of exemplary synchronization circuit 300 for synchronizing the output of a state machine to a clock domain. Exemplary synchronization circuit 300 comprises latch 302, latch 304, inverter 306, inverter 307, AND gate 308, and state machine logic circuit 310. The data input (D) of latch 302 is connected to the Anext state@ output (NEXT) of state machine logic circuit 310, and the enable input (EN) of latch 302 is permanently connected to a Logic 1 enabling signal. Latch 302 transfers NEXT to its Q output on the rising edge of CLK.

The output of latch 302 is connected to the data (D) input of latch 304. Inverters 306 and 307 invert the CLK signal. The inverted CLK signal is one input to AND gate 308. The other input of AND gate 308 receives the PHASE signal. The output of AND gate 308 is a gated clock signal that is Ahigh@ (or Logic 1) when inverted CLK and PHASE are both high. The output of AND gate 308 is connected to the enable (EN) input of latch 304. Latch 304 transfers the clocked output of latch 302 to the Q output of latch 304 on the rising edge of the inverted CLK signal from inverter 307, providing an output which is synchronized with clock domain of the CLK domain. The Q output of latch 304 represents the current state (CURRENT) which is connected as the input to Logic circuit 310. Since the CURRENT input to state machine logic circuit 310 is synchronized with the CLK signal, the NEXT output of state machine logic circuit 310 is also synchronized with the CLK signal.

Figure 4:
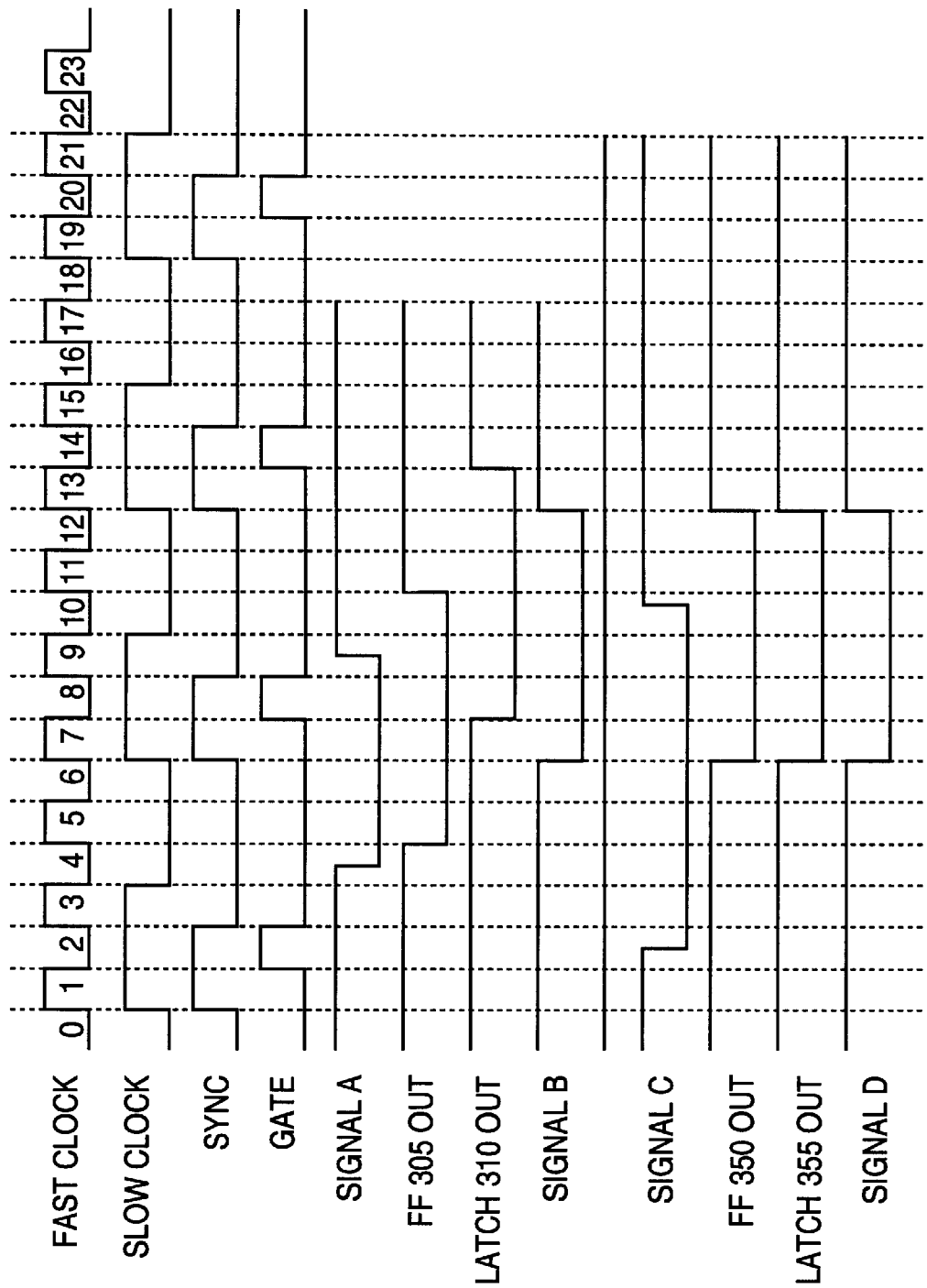
FIG. 4 is a schematic diagram of a synchronization circuit for synchronizing the transfer of data between two asynchronous clock domains.

FIG. 4 is a schematic diagram of exemplary synchronization circuit 400 for synchronizing the transfer of data between two asynchronous clock domains. Synchronization circuit 400 transfers the DATA signal off-chip to another circuit connected to pin 430. Latches 402, 404, and 410 and multiplexer 412 form synchronizing circuit for an input data signal, labeled ADATA@ in FIG. 4. Latches 420, 422, and 424 and multiplexer 426 form a synchronizing circuit for an input data enable signal, labeled ADATA ENABLE@ in FIG. 4. Inverter 406 and AND gate 408 provide a gated inverted clock signal for use by both synchronizing circuit groups. Inverter 428 and tri-state driver 414 provide means for transferring synchronized data during the high level of the DATA ENABLE signal from multiplexer 412 to pin 430.

Latch 402 transfers the DATA signal from input D to output Q on the rising edge of the CLK signal. The enable (EN) input to latch 402 is connected to Logic 1. The output Q of latch 402 is connected to input D of latch 404. Inverter 406 inverts CLK and supplies inverted CLK as an input to AND gate 408. The other input of AND gate 408 receives the signal labeled APHASE@ in FIG. 4. The inverted CLK output from AND gate 408 is supplied as the enable (EN) input for latches 404, 410, 422, and 424.

Inverter 407 inverts the CLK signal and clocks latch 404. Latch 404 transfers the output of latch 402 to its output Q on the rising edge of the output from inverter 407. In a similar manner, latch 410 transfers the DATA signal from its D input to its Q output on the rising edge of the output of inverter 407. The output of latches 404 and 410 are provided as data inputs to multiplexer 412. The phase-select signal, labeled APHASE SELECT@ in FIG. 4 selects one of the two data inputs of multiplexers 412 and 426. Thus, multiplexer 412 transfers the output of latch 404 to its output when PHASE SELECT is high and multiplexer 412 transfers the output of latch 410 to its output when PHASE SELECT is low.

The output of multiplexer 412 is connected to the non-inverting input of tri-state driver 414. Inverter 428 inverts the output from multiplexer 426 and provides this as the inverted input to tri-state driver 414. Tri-state driver 414 transfers the output of multiplexer 412 to its output when the output of inverter 428 is low (Logic 0). Thus, tri-state driver 414 transfers the output of multiplexer 412 to pin 430 when the output of multiplexer 426 is high. Otherwise, the tri-state driver 414 provides a high impedance to pin 430.

As previously described, the synchronizing circuit composed of latches 420, 422, and 424, and multiplexer 426 operates in the same manner as previously described for the DATA signal, except that the DATA ENABLE signal is transferred in place of the DATA signal. The Q outputs of latches 422 and 424 are provided as inputs to multiplexer 426, with the PHASE SELECT signal controlling the output of multiplexer 426. Multiplexer 426 transfers the output of latch 422 to inverter 428 when PHASE SELECT is high and transfers the output of latch 424 to inverter 428 when PHASE SELECT is low. As previously discussed, tri-state driver 414 provide means for transferring the DATA signal from multiplexer 412 to pin 430 during the high level of DATA ENABLE signal from multiplexer 426.

Figure 5:
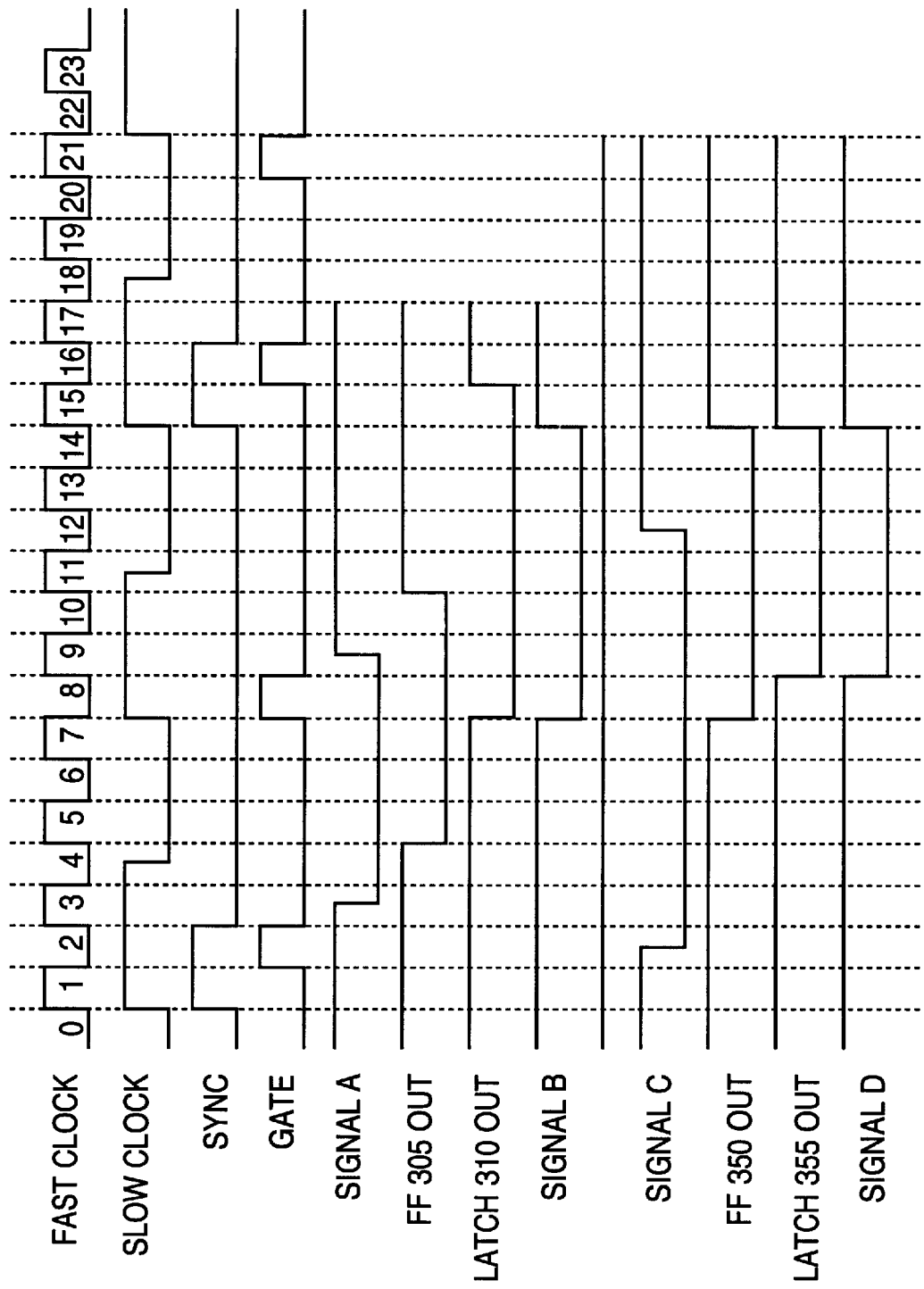
FIG. 5 is a timing diagram illustrating the operations of the synchronization circuits illustrated in FIGS. 3 and 4 in accordance with an exemplary embodiment of the present invention.

FIG. 5 is a timing diagram illustrating the operations of the synchronization circuits illustrated in FIGS. 3 and 4 in accordance with an exemplary embodiment of the present invention. The timing diagram shows the signals: CLOCK (labeled ACLK@ in FIGS. 3 and 4), 2:1 CLOCK, PHASE, PHASE SELECT, DATA, DATA ENABLE, PIN-OUT, NEXT STATE, and STATE (labeled ACURRENT@ in FIG. 3).

CLOCK is square wave in which high and low intervals (or pulses) are sequentially numbered. Even numbers represent the low pulses of CLOCK and odd numbers represent the high pulses of CLOCK. An even and odd numbered pair of adjacent pulses represents a single cycle for CLOCK. The 2:1 CLOCK time line represents a clock signal which is running at half the rate of CLOCK. For this example, 2:1 CLOCK transitions to high or low when CLOCK transitions from low to high. The time line for PHASE depicts an inverse relationship to the 2:1 CLOCK time line (i.e., high when 2:1 CLOCK is low and low when 2:1 CLOCK is high). For the purposes of this example, PHASE SELECT is shown as always high.

The DATA signal is only transferred to the output of multiplexer 412 when the PHASE signal is high. During pulses 3 and 4 (i.e., one cycle of CLOCK), the DATA signal goes low when PHASE is high. At the same time, during pulses 3 and 4 (i.e., one cycle of CLOCK), the DATA ENABLE signal goes high and is clocked through to tri-state driver 414. Thus, the DATA signal is driven through to PIN-OUT which goes from high to low. Subsequently, during pulses 5 through 12, the DATA signal goes high again. However, the PHASE does not go high again until pulses 7 and 8. During pulses 7 and 8, the high DATA signal is driven through latch 404 and multiplexer 412 to tri-state driver 414. Since DATA ENABLE signal is still held high by latch 422, tri-state driver 414 is still enabled. Thus, the DATA signal is driven through to PIN-OUT, which goes from low to high. Another exemplary pulse of the DATA signal is driven through to PIN OUT during pulses 17–20.

In FIG. 3, the output of latch 304, labeled ACURRENT@ in FIG. 3 and ASTATE@ in FIG. 5, can only change when PHASE is high and CLOCK is low (i.e., pulses 4, 8, 12, 16, etc.). Thus, STATE transitions to State 0 during pulse 4, to State 1 during pulse 8, to State 2 during pulse 12, and finally back to State 0 during pulse 16.

Figure 6:
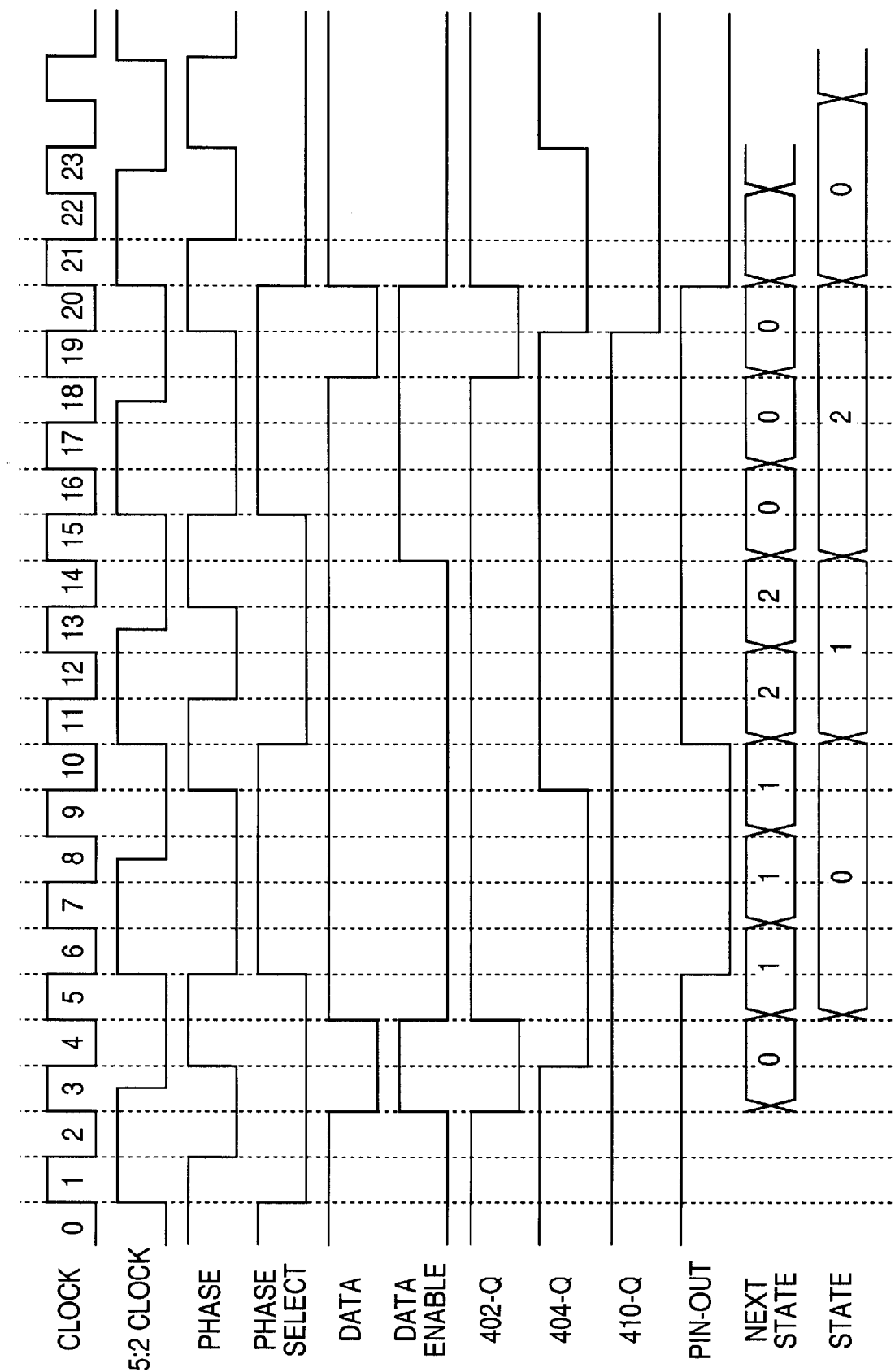
FIG. 6 is a timing diagram illustrating the operations of the synchronization circuits illustrated in FIGS. 3 and 4 in accordance with an exemplary embodiment of the present invention.

FIG. 6 is a timing diagram illustrating the operations of the synchronization circuits illustrated in FIGS. 3 and 4 in accordance with an exemplary embodiment of the present invention. For this example, CLOCK is 2.5 times faster than 5:2 CLOCK, with the positive transition of 5:2 CLOCK coinciding with the beginning of every fifth half-cycle of CLOCK. The PHASE signal=s high interval always begins and ends with a falling edge of CLOCK and it remains high for one CLOCK cycle. PHASE SELECT essentially represents a 5:1 CLOCK which makes its transitions on the rising edge of the 5:2 CLOCK. In other words, PHASE SELECT cycles at half the rate of 5:2 CLOCK and one fifth the rate of CLOCK.

As in FIG. 5, the DATA signal is only transferred to the output of multiplexer 412 when the PHASE signal is high. Latches 404 and 410 are clocked and transfer data from input to output when PHASE is high and CLOCK is low. Latches 422 and 424 are clocked by the inverted CLOCK and transfer data from input to output when PHASE SELECT is high. PHASE SELECT is used to select the output of multiplexers 412 and 426 so that the PIN OUT signal is synchronized to the domain of the 5:2 clock signal.

Although the present invention has been described in detail, those skilled in the art should understand that they can make various changes, substitutions and alterations herein without departing from the spirit and scope of the invention in its broadest form.

What is claimed is:

1. An interface circuit for synchronizing the transfer of data through an output port from a first clock domain driven by a first clock signal to a second clock domain driven by a second clock signal, the interface circuit comprising:
    a first latch having a data input for receiving a data signal from said first clock domain, an enable input for receiving said first clock signal, a clock input for receiving said first clock signal; and an output;
    a second latch having a data input coupled to said first latch output, a clock input for receiving a gating signal, a clock input for receiving said first clock signal, and an output;
    a third latch having a data input for receiving said data signal, an enable input for receiving a phase select signal, a clock input for receiving said first clock signal, and an output; and
    a multiplexer having a first data input coupled to said second latch output, a second data input coupled to said third latch output, and a selector input for selecting one of said first data input and said second data input for transfer to an output of said multiplexer.

2. The interface circuit set forth in claim 1 wherein said second clock signal and said first clock signal are derived from a common core clock.

3. The interface circuit set forth in claim 2 wherein a frequency of said second clock signal and a frequency of said first clock signal are in a ratio of N:1 where N is an integer.

4. The interface circuit set forth in claim 3 wherein a selection signal applied to the selector input selects said first data input of said multiplexer when a rising edge of said first clock signal is approximately in phase with a rising edge of said second clock signal.

5. The interface circuit set forth in claim 2 wherein a frequency of said second clock signal and a frequency of said first clock signal are in a ratio of (N+2):1 where N is an integer.

6. The interface circuit set forth in claim 5 wherein a selection signal applied to the selector input selects said first data input of said multiplexer during one clock cycle of said second clock signal.

7. An interface circuit for synchronizing the transfer of data from an output of a state machine in a first clock domain driven by a first clock signal to a second clock domain driven by a second clock signal, the interface circuit comprising:
    a first latch having a data input for receiving said state machine output, an enable input that is set to an enabled value, and an output; and
    a second latch having a data input coupled to said first latch output, an enable input for receiving a gating signal, a clock input for receiving said first clock signal, and an output coupled to an input of said state machine.

8. The interface circuit set forth in claim 7 wherein said second clock signal and said first clock signal are derived from a common core clock.

9. The interface circuit set forth in claim 8 wherein a frequency of said second clock signal and a frequency of said first clock signal are in a ratio of N:1 where N is an integer.

10. The interface circuit set forth in claim 8 wherein a frequency of said second clock signal and a frequency of said first clock signal are in a ratio of (N+2):1 where N is an integer.

11. A computer system comprising:
    a pipelined, x86-compatible processor having dual integer and dual floating point execution units, separate load/store and branch units, an L1 instruction cache and an L1 data cache;
    system memory for storing data or instructions;
    a core clock; and
    an interface circuit for synchronizing the transfer of data through an output port from a first clock domain driven by a first clock signal to a second clock domain driven by a second clock signal, the interface circuit comprising:
        a first latch having a data input for receiving a data signal from said first clock domain, a clock input for receiving said first clock signal, an enable input that is set to an enabled value and an output;
        a second latch having a data input coupled to said first latch output, an enable input for receiving a gating signal, a clock input for receiving said first clock signal, and an output;
        a third latch having a data input for receiving said data signal, a enable input for receiving a phase select signal, a clock input for receiving said first clock signal, and an output; and
        a multiplexer having a first data input coupled to said second latch output, a second data input coupled to said third latch output, and a selector input for selecting one of said first data input and said second data input for transfer to an output of said multiplexer.

12. The computer system set forth in claim 11 wherein said second clock signal and said first clock signal are derived from said core clock.

13. The computer system set forth in claim 12 wherein a frequency of said second clock signal and a frequency of said first clock signal are in a ratio of N:1 where N is an integer.

14. The computer system set forth in claim 13 wherein a selection signal applied to the selector input selects said first data input of said multiplexer when a rising edge of said first clock signal is approximately in phase with a rising edge of said second clock signal.

15. The computer system set forth in claim 12 wherein a frequency of said second clock signal and a frequency of said first clock signal are in a ratio of (N+2):1 where N is an integer.

16. The computer system set forth in claim 15 wherein a selection signal applied to the selector input selects said first data input of said multiplexer during one clock cycle of said second clock signal.

17. A computer system comprising:
- a pipelined, x86-compatible processor having dual integer and dual floating point execution units, separate load/store and branch units, an L1 instruction cache and an L1 data cache;
- system memory for storing data or instructions;
- a core clock; and
- an interface circuit for synchronizing the transfer of data from an output of a state machine in a first clock domain driven by a first clock signal to a second clock domain driven by a second clock signal, the interface circuit comprising:
  - a first latch having a data input for receiving said state machine output, a clock input for receiving said first clock signal, an enable input set to an enabled value, and an output; and
  - a second latch having a data input coupled to said first latch output, an enable input for receiving a gating signal, a clock input for receiving said first clock signal, and an output coupled to an input of said state machine.

18. The computer system set forth in claim 17 wherein said second clock signal and said first clock signal are derived from a common core clock.

19. The computer system set forth in claim 18 wherein a frequency of said second clock signal and a frequency of said first clock signal are in a ratio of N:1 where N is an integer.

20. The computer system set forth in claim 18 wherein a frequency of said second clock signal and a frequency of said first clock signal are in a ratio of (N+2):1 where N is an integer.

* * * * *

UNITED STATES PATENT AND TRADEMARK OFFICE
CERTIFICATE OF CORRECTION

PATENT NO. : 6,535,946 B1  Page 1 of 5
DATED : March 18, 2003
INVENTOR(S) : Christopher D. Bryant and Robin W. Edenfield It is certified that error appears in the above-identified patent and that said Letters Patent is hereby corrected as shown below:

<u>Drawings,</u>
Sheet 3 of 6, delete

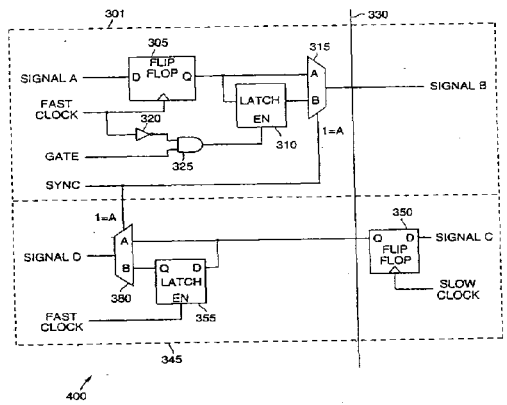

FIG. 3 and insert

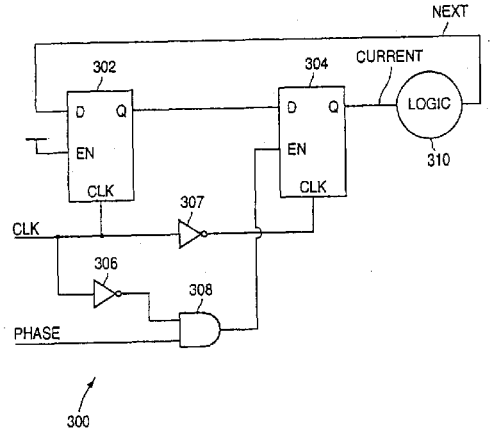

FIG. 3

UNITED STATES PATENT AND TRADEMARK OFFICE
CERTIFICATE OF CORRECTION

PATENT NO. : 6,535,946 B1
DATED : March 18, 2003
INVENTOR(S) : Christopher D. Bryant and Robin W. Edenfield It is certified that error appears in the above-identified patent and that said Letters Patent is hereby corrected as shown below:

Drawings (cont'd),
Sheet 4 of 6, delete

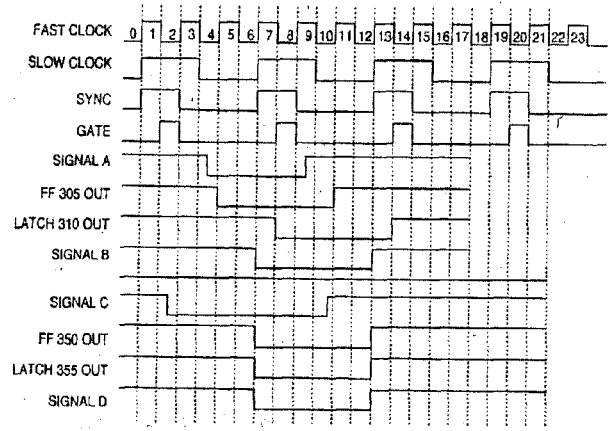

FIG. 4 and insert

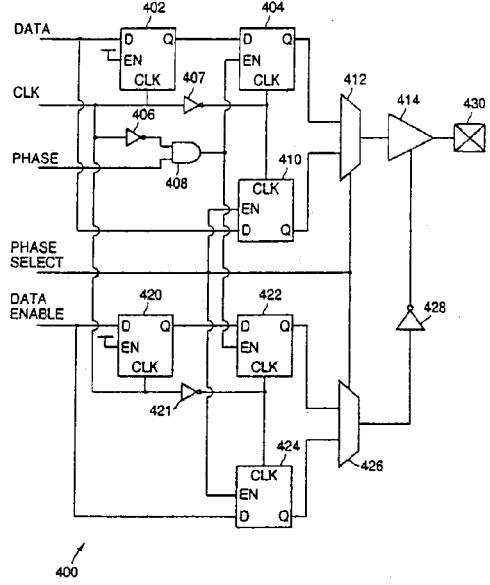

FIG. 4

UNITED STATES PATENT AND TRADEMARK OFFICE
CERTIFICATE OF CORRECTION

PATENT NO. : 6,535,946 B1  
DATED : March 18, 2003  
INVENTOR(S) : Christopher D. Bryant and Robin W. Edenfield Page 3 of 5

It is certified that error appears in the above-identified patent and that said Letters Patent is hereby corrected as shown below:

<u>Drawings (cont'd),</u>  
Sheet 5 of 6, delete

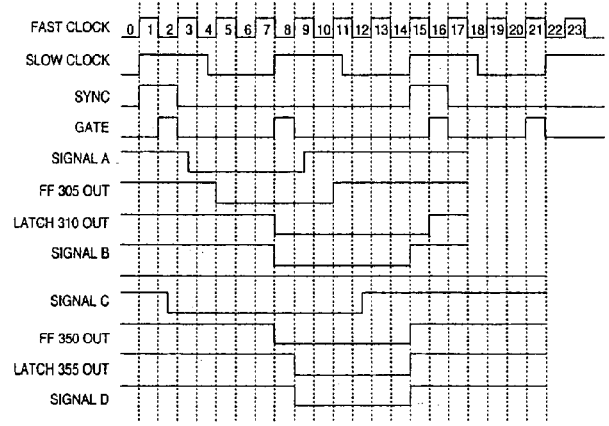

FIG. 5 and insert

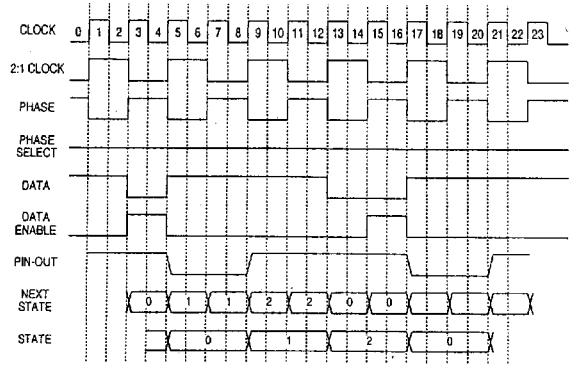

FIG. 5

UNITED STATES PATENT AND TRADEMARK OFFICE
CERTIFICATE OF CORRECTION

PATENT NO. : 6,535,946 B1
DATED : March 18, 2003
INVENTOR(S) : Christopher D. Bryant and Robin W. Edenfield It is certified that error appears in the above-identified patent and that said Letters Patent is hereby corrected as shown below:

Column 1,
Line 11, after "entitled", delete -- A --.
Line 65, delete "Adouble sampled@" and insert -- "double sampled" --.

Column 2,
Line 44, delete "sel3ect" and insert -- select --.

Column 3,
Line 43, delete "Ainclude@ and Acomprise,@" and insert -- "include" and "comprise," --.
Line 44, delete "Aor,@" and insert -- "or," --.
Lines 45-46, delete "Aassociated with@ and Aassociated therewith,@" and insert -- "associated with" and "associated therewith," --.
Line 51, delete "Acontroller@" and insert -- controller --.

Column 7,
Line 7, delete "Anext state@" and insert -- next state --.
Line 16, delete "Ahigh@" and insert -- high --.
Line 34, delete "ADATA@" and insert -- DATA --.
Line 36, delete "ADATA ENABLE@" and insert -- "DATA ENABLE" --.
Line 48, delete "APHASE@" and insert -- PHASE --.
Line 58, delete "APHASE SELECT@" and insert PHASE SELECT --.

Column 8,
Line 23, delete "ACLK@" and insert -- CLK --.
Lines 25 and 57, delete "ACURRENT@" and insert -- CURRENT --.
Line 58, delete "ASTATE@" and insert -- STATE --.

UNITED STATES PATENT AND TRADEMARK OFFICE
CERTIFICATE OF CORRECTION

PATENT NO. : 6,535,946 B1
DATED : March 18, 2003
INVENTOR(S) : Christopher D. Bryant and Robin W. Edenfield It is certified that error appears in the above-identified patent and that said Letters Patent is hereby corrected as shown below:

<u>Column 9,</u>
Line 2, delete "signal=s" and insert -- signal's --.

Signed and Sealed this

Twenty-first Day of September, 2004

JON W. DUDAS
*Director of the United States Patent and Trademark Office*